United States Patent [19]
Roth

[11] 3,790,829
[45] Feb. 5, 1974

[54] THERMOELECTROMAGNETIC ENERGY CONVERSION SYSTEM

[76] Inventor: Gregory L. Roth, 5712 Park West Cir., Alhambra, Calif. 90620

[22] Filed: July 13, 1972

[21] Appl. No.: 271,246

[52] U.S. Cl............................ 310/4, 136/205, 62/3
[51] Int. Cl. ............................................ H02n 3/00
[58] Field of Search....... 310/4; 136/203, 205; 62/3; 322/2

[56] References Cited
UNITED STATES PATENTS

| | | | |
|---|---|---|---|
| 3,664,881 | 5/1972 | Love................................... | 136/205 |
| 3,478,230 | 11/1969 | Otter, Jr. et al. ........................ | 310/4 |
| 3,547,705 | 12/1970 | Heard, Jr............................. | 310/4 X |
| 3,343,009 | 9/1967 | Wagini et al........................... | 310/4 |
| 3,197,748 | 7/1965 | Dailey................................. | 310/4 X |
| 3,322,575 | 5/1967 | Ruehrwein........................... | 310/4 X |
| 3,224,206 | 12/1965 | Sizelove........................... | 136/203 X |

Primary Examiner—D. F. Duggan

[57] ABSTRACT

A thermoelectromagnetic energy conversion system includes a p-n semiconductor junction having a space charge region on either side thereof and a magnet providing a magnetic flux through the space charge region in a direction parallel to the junction, and a source of thermal energy. Electrical contact may be made to two end regions of the junction which are spaced apart in a longitudinal direction perpendicular to the flux direction and centrally located dielectric regions on either side of the depletion region permit electrical communication between the end regions only through the depletion region. As electrons and holes which are thermally generated within the space charge region drift toward the edges thereof, the magnetic flux provides a longitudinally directed force on the mobile carriers which establishes a voltage potential between the two end regions.

16 Claims, 4 Drawing Figures

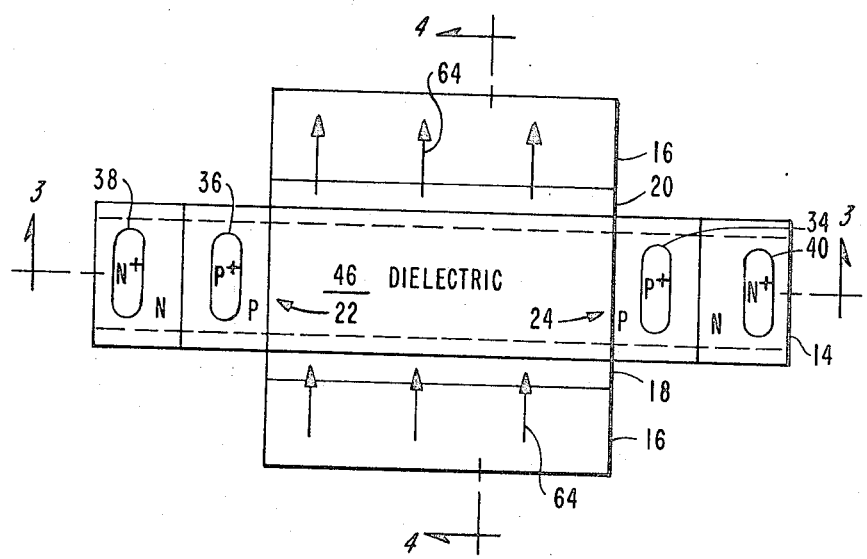
FIG.—2
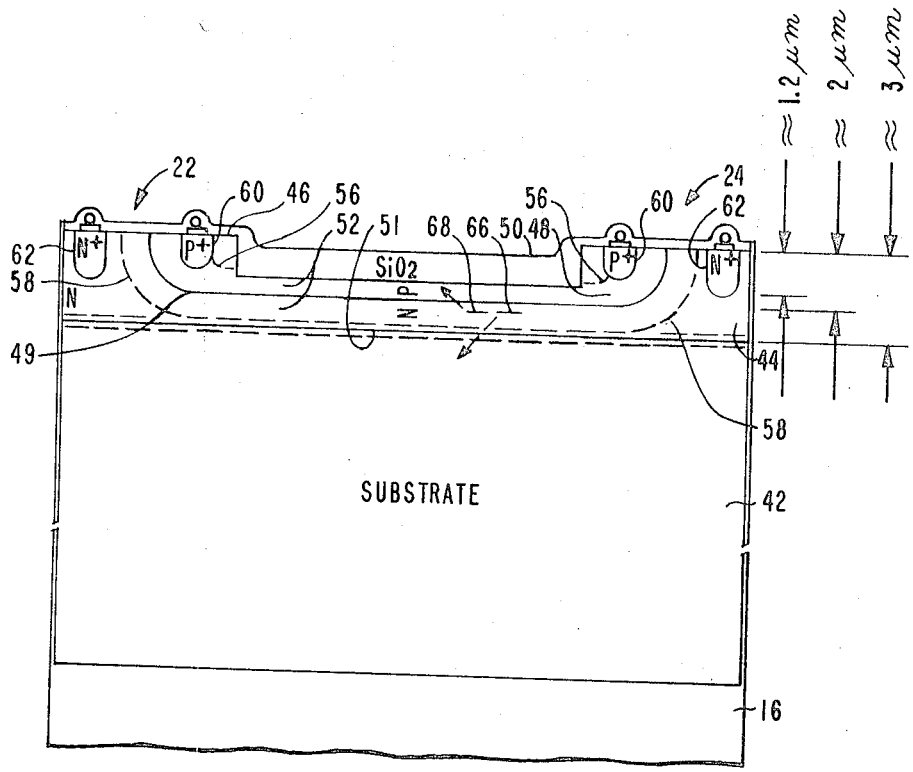
FIG.—3

THERMOELECTROMAGNETIC ENERGY CONVERSION SYSTEM

BACKGROUND OF THE INVENTION

1. Field of the Invention

This invention relates to systems for converting thermal energy into electrical energy and more particularly to a solid state thermoelectromagnetic energy converter.

2. History of the Prior Art

The motion of a charged mobile charge carrier within a magnetic field generates an accelerating force on the carrier tending to move it in a longitudinal direction perpendicular to both the direction of motion and the magnetic field. The resulting force from this phenomenon, known as the Hall effect, generates a voltage in the longitudinal direction of acceleration.

The carrier velocity which is required for interaction with the magnetic field is conventionally attained by applying an external voltage potential in the direction of desired current flow or by creating a concentration gradient of mobile charge carriers. A Hall effect device which utilizes an externally induced current is commonly used as a multiplier or mixer where the resulting Hall effect voltage is taken as an output representing the product of the magnetic field and current inputs.

In other arrangements, the carrier motion is attained by creating a concentration gradient of mobile charge carriers. These carriers tend to diffuse from a region of high concentration toward a region of lower concentration, thus providing the required motion. The concentration gradient may be obtained by establishing a thermal gradient or by directing photons at the Hall effect device. The rate at which mobile charge carriers are generated within a block of semiconductor material increases exponentially with temperature. For this reason there will be a high concentration of carriers in a region of high temperature and they will diffuse toward a low temperature region where the carrier concentration is much smaller. Similarly, a region of high carrier concentration is created where photons are incident upon a block of semiconductor material and these carriers tend to diffuse toward a region of lower concentration.

SUMMARY OF THE INVENTION

A thermoelectromagnetic energy conversion system in accordance with the invention includes a source of energy, a magnet generating a magnetic field and a junction having a contact potential thereacross. Mobile charge carriers are generated within a region of electric field intensity adjacent the junction in response to the receipt of energy, such as thermal energy, from the energy force. As these carriers drift across the junction under the influence of the contact potential created electric field intensity, they interact with the flux of the magnetic field, generating a voltage in a longitudinal direction perpendicular to both the magnetic flux direction and direction of motion. An insulating region in communication with the region of electric field intensity or space charge region may be used to electrically isolate longitudinally spaced apart contact regions except through the region electric field intensity. This insulation permits the resulting longitudinal voltage to be integrated or accumulated along the longitudinal direction.

In a specific arrangement, the contact potential is created across a p-n junction formed in a block of semiconductor material such as silicon using conventional processes. The insulating region may be formed by forming silicon monoxide, silicon dioxide or silicon nitride to a depth which brings it into contact with the space charge or depletion region associated with the junction. The insulation may also be provided in a silicon on sapphire divide where the p-n junction is located sufficiently close to the insulating sapphire substrate that the depletion region is in communication therewith.

BRIEF DESCRIPTION OF THE DRAWINGS

A better understanding of the invention may be had from a consideration of the following detailed description taken in conjunction with the accompanying drawings in which:

FIG. 2 is an elevational plan view of the thermoelectromagnetic energy converter shown in FIG. 1;

FIG. 3 is a sectional view greatly expanded in the vertical direction of the thermoelectromagnetic energy converter taken along line 3—3 in the direction of the arrows as shown in FIG. 2.

DETAILED DESCRIPTION

Figure 1:
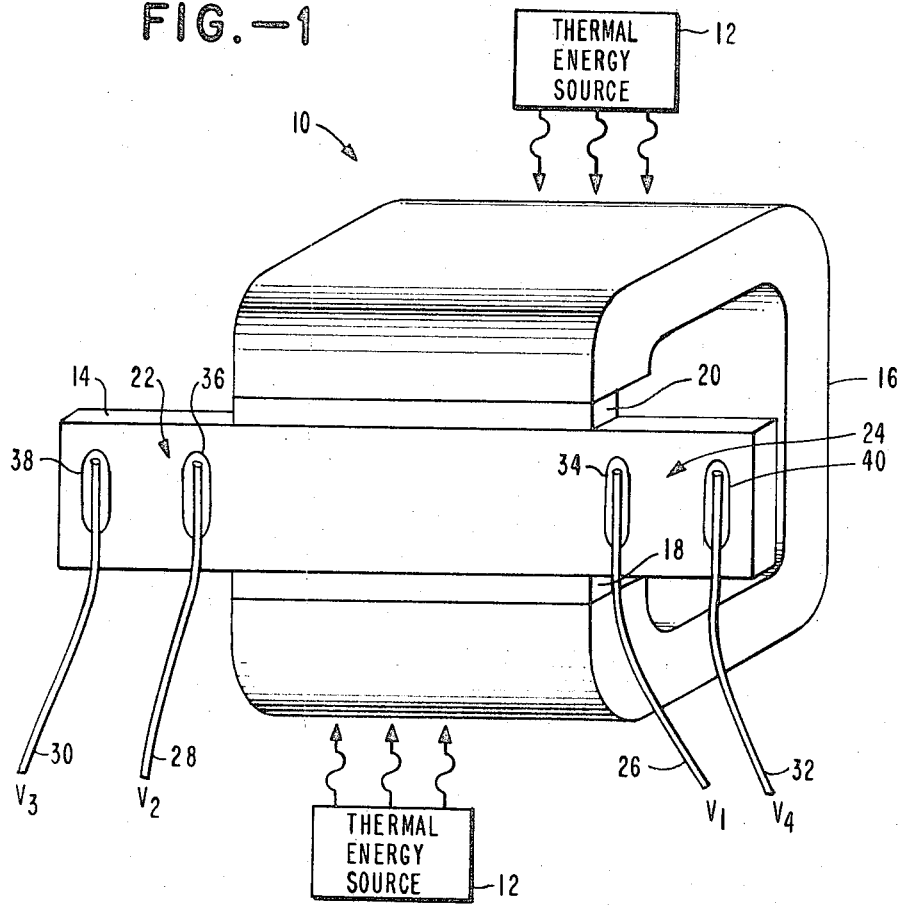
FIG. 1 is a perspective view of a thermoelectromagnetic energy conversion system in accordance with the invention.

As shown in FIG. 1 a thermoelectromagnetic energy conversion system 10 in accordance with the invention includes at least one source of thermal energy 12, a chip of semiconductor material 14 having a p-n junction and a magnet 16 with pole pieces 18, 20 providing a magnetic flux along the junction of the semiconductor chip 14. The semiconductor chip 14 has two end regions 22, 24 which are spaced apart along a longitudinal dimension which is perpendicular to the direction of magnetic flux. Electrical contact is made to the chip 14 in the end regions 22, 24 by leads 26, 28, 30 and 32 which are attached to metalized bonding pads 34, 36, 38, 40 on the p and n sides of the junction respectively.

The thermal energy source 12 may provide thermal energy in a conventional manner such as oxidation of an organic fuel, a thermonuclear reaction or by radiation from the sun. So long as the thermal energy is not so intense as to impair operation of or cause physical damage to the system 10, the particular source 12 of thermal energy does not have special importance. The magnet 16 which generates magnetic flux through a space charge region or region of magnetic field intensity about the junction is represented as a permanent magnet but may also be an electromagnet powered by either the thermoelectric energy converter or an independent supply.

Figure 4:
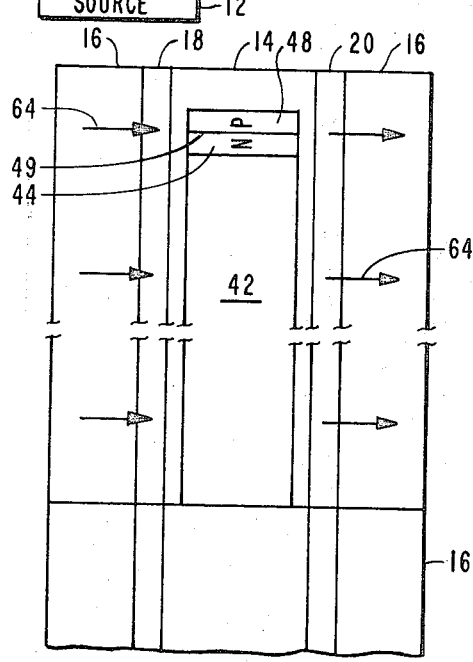
FIG. 4 is a sectional view greatly expanded in the vertical direction of the thermoelectromagnetic energy converter taken along line 4—4 in the direction of the arrows shown in FIG. 2.

The single crystal semiconductor chip 14 is shown in greater detail in FIGS. 2–4 and includes a substrate 42 which may be sapphire with a layer of silicon 44 thereon or may be lightly doped, high resistivity silicon with an epitaxial layer 44 grown thereon. The layer 44 is in this example n-type material doped with a concentration of about $10^{15}$ atoms/cm$^3$. It is desirable that the substrate 42 be a good electrical insulator so that there will be no high conductivity path between the contact points 38, 40 on the n side of the p-n junction. In this example, the material forming the layer 44 in which the junction is formed is silicon, but in general other materials may be used. These materials may particularly include other semiconductor materials such as germanium, gallium arsenide, gallium phosphide, or silicon carbide. Although the layer 44 could also be a p-type layer with an n-type dopant diffused therein, in this example it is assumed that the layer 44 is an n-type epitaxial layer grown on a nearly intrinsic substrate 42. The epitaxial layer 44 may be made n-type by doping it with an n-type dopant such as phosphorous, antimony or arsenic as it is grown. In this example, the epitaxial layer is approximately 3 microns ($3 \times 10^{-6}$ meters) deep and is doped with phosphorous in a concentration of approximately $10^{15}$ atoms/cm$^3$.

An acceptor material such as boron, having a concentration of $10^{16}$ atoms/cm$^3$ in this example, is diffused into a portion of a surface 46 of the epitaxial layer 44 to form a p-type region 48 therein. The boron diffusion, which may be performed in accordance with a conventional planar process, is controlled so as to create a planar p-n junction 49 at a depth of about 2 $\mu$m below the surface 46 and about 1 $\mu$m above the transition from the high resistivity n-type substrate 42 to the epitaxial layer 44. The high resistivity substrate 42 thus provides dielectric isolation of the end regions 22, 24 except through the space charge layer 54. A dielectric region 50 is then formed in the planar surface 46 between the spaced apart end regions 22, 24 by a suitable process of etching and then forming a dielectric material such as SiO$_2$. This dielectric region 50 extends approximately 1.2 $\mu$m beneath the surface 46.

In accordance with well known principles, a depletion region 52 is formed about the junction 49 and is represented as being bounded by dashed lines 56, 58, adjacent the p and n sides of the junction 49, respectively. The depletion or space charge region 52 is formed by the diffusion of n and p type carriers across the junction 49 and contains bound charges which create an electric contact potential of about 0.6 volt across the junction but very few mobile holes or electrons. Because of this contact potential, the depletion region 52 is also a region of electric field intensity. The depletion region 52 extends about 1 $\mu$m on either side of the junction 49 under unbiased conditions and thus is intercepted by and in communication with the dielectric region 50 and the high resistivity substrate 42.

As shown in greater detail in FIG. 4, the dielectric region 50 not only communicates with the depletion layer 52 but also extends around the entire surface of the chip 14 to form a passivating protective layer which seals the chip 14 from external contaminants. The dielectric region 50 intercepts the junction 49 in a central part of the chip 14 between the two end regions 22, 24 which are thus electrically isolated except through the depletion region 52. Since the depletion region 52 is nearly free of mobile carriers it is able to support an electric field along the longitudinal dimension. The sides of the junction 49 are thus passivated in a manner similar to the passivation of a mesa diode while the ends are brought to the surface in the end regions 22, 24 in a manner similar to techniques used in making a planar diode. Heavily doped p-type regions (P$^+$) 60 and heavily doped n-type regions (N$^+$) 62 provide regions of high conductivity for good ohmic contact with pads 34, 36 and 38, 40 respectively.

As illustrated by arrows 64, the magnetic flux passes through the depletion region 52 parallel to the junction 49 and perpendicular to the longitudinal dimension which separates the end regions 22, 24. As electrons, represented by "−" 66, and holes represented by "+" 68, are generated in the depletion region 52, they drift toward the n and p sides 58, 56 respectively of the depletion region 52 under the influence of the electric field intensity which is created by the bound charges in the depletion region 52 which result from the different contact potentials of the p and n materials on either side of the junction 49. The drift velocity in the presence of a magnetic flux density in the direction shown creates an accelerating force causing the electron 66 and hole 68 to drive longitudinally toward the lefthand end region 22. This force has a magnitude of $F = Bq(dL/dt)$, where $F$ is force, $B$ is magnetic flux density, $q$ is the charge on an electron and $dL/dt$ is the velocity component of the mobile carrier in a direction normal to the junction. This formula is a well known formula representing the motion of a charged particle in a magnetic field.

As large numbers of mobile carriers drift toward the end region 22, an equilibrium condition is eventually established wherein the electric field intensity formed by the leftward drift of the mobile carriers 66, 68 balances the force on the carriers created by their motion in the magnetic field. The p-n junction will thus become forward biased near the end region 22 and reverse biased near the end region 24.

Voltage potentials are thus established with lead 26 at the lowest potential $V_1$ and lead 32 at the highest potential $V_4$. Since the junction 49 is forward biased, the leads 28 and 30 have nearly equal potentials $V_2$ and $V_3$ respectively. $V_2 - V_1$ and $V_4 - V_3$ are both approximately equal to $(V_4 - V_1)/2$. These voltage potentials thus represent electrical energy which is available for external use.

A voltage will thus be generated between the longitudinally spaced apart contact pairs of regions 34, 36 and 38, 40. This voltage is variously determinable in accordance with the equation $V_H = Ed = Bvd =(BJd/\rho)$, where $V_H$ is the resulting voltage potential along the longitudinal dimension, $E$ is the electric field intensity in the longitudinal dimension, $d$ is distance along the longitudinal dimension, $B$ is magnetic flux density in a transverse direction along the plane of the junction, $v$ is a drift velocity through the depletion region 52 in a direction perpendicular to the plane of the junction, $J$ is the current density in a direction normal to the junction and $\rho$ is the mobile carrier concentration. It can be seen from inspection of the above equation that the electrical isolation of longitudinally spaced apart contacts permits the resulting voltage $V_H$ to be increased by increasing the effective longitudinal distance, $d$. This has the effect of integrating or accumulating the resulting longitudinal electric field intensity along the longitudinal dimension.

Although there has been described above a particular arrangement of a thermoelectromagnetic energy conversion system in accordance with the invention for the purpose of showing how the invention can be used to advantage, it should be appreciated that the invention is not limited thereto. Accordingly, all modifications, variations or equivalent arrangements which may occur

What is claimed is:

1. A thermoelectromagnetic energy conversion system comprising:
   a thermal energy source;
   a generally planar semiconductor p-n junction in energy receiving relationship with the thermal energy source, the p-n junction having a depletion region extending on either side thereof;
   means for generating a magnetic field through the depletion region in a transverse direction parallel to the p-n junction;
   means for providing electrical contact to at least one side of the p-n junction at locations spaced apart along a longitudinal dimension parallel to the junction; and
   means in communication with the depletion region on the at least one side of the junction for providing electrical insulation between the electrical contacts.

2. A semiconductor device having a p-n junction with a depletion region on either side thereof which is insertable in a magnetic field passing through the depletion region in a transverse direction generally parallel to the p-n junction, the depletion region extending to an insulating medium on at least one side of the junction, said medium providing a high resistivity path along a longitudinal dimension parallel to the junction to permit accumulation along the longitudinal path of a potential gradient caused by interaction of mobile carriers generated within the depletion region with the transverse magnetic field.

3. A thermoelectromagnetic device comprising a junction lying in a plane having a contact potential thereacross and producing a region having an electric field intensity on at least one side of the junction, the electric field intensity having a direction generally perpendicular to the plane of the junction and accelerating mobile charge carriers which are generated within the region of magnetic field intensity in a direction perpendicular to the plane of the junction, and a plurality of electrical contacts in low resistance communication with the region of electric field intensity on the at least one side of the junction, the contacts being spaced apart along a longitudinal direction parallel to the plane of the junction and there being no path of high conductivity interconnecting adjacent pairs of contacts on the at least one side of the junction.

4. The thermoelectromagnetic device as set forth in claim 3 above, further comprising a magnet providing a magnetic field through the region of electric field intensity in a transverse direction parallel to the plane of the junction and a source of thermal energy positioned to transfer thermal energy to the region of electric field intensity.

5. The invention as set forth in claim 3 above, wherein the junction is formed by p and n type semiconductor materials in abutting relationship.

6. The invention as set forth in claim 5 above, further comprising a barrier of insulating material positioned between adjacent contacts, the insulating barrier being in communication with the region of electric field intensity and permitting conduction of current between adjacent contacts only through said region.

7. The invention as set forth in claim 6 above, wherein the p and n semiconductor materials are both predominantly silicon and the insulating barrier is of the class of materials consisting of silicon monoxide, silicon dioxide and silicon nitride.

8. The invention as set forth in claim 5 above, wherein the p and n semiconductor materials are both predominantly from the class of materials consisting of germanium, silicon, gallium arsenide, gallium phosphide and silicon carbide.

9. For use in a thermoelectromagnetic energy conversion system having a source of thermal energy and a magnetic field, a thermoelectromagnetic device positionable in the magnetic field in energy receiving relationship with the thermal energy source comprising:
   a junction of two dissimilar types of materials creating a contact potential across a region of electric field intensity extending along the junction and at least one pair of spaced apart electrical contacts in low resistance communication with the region of electric field intensity on at least one side of the junction, there being no low resistance path between the spaced apart contacts.

10. The invention as set forth in claim 9 above, wherein the p and n type materials are semiconductor materials having a concentration of mobile charge carriers between $1 \times 10^7$ and $1 \times 10^{28}$ mobile carriers per cubic meter.

11. An electromagnetic energy conversion system comprising a source of energy; means for generating a magnetic field, means defining a p-n semiconductor junction having a region of electric field intensity in proximity thereto, said region being in energy receiving relationship with the energy source and generating electron-hole pairs in response to the receipt of energy, said electrons and holes being accelerated to motion by the electric field within the region, the junction being positioned within the magnetic field with an orientation causing holes and electrons moving under the electric field to be accelerated in a longitudinal direction along the junction due to interaction with the magnetic field.

12. The invention as set forth in claim 11 above, further comprising means for integrating electric field intensities induced by longitudinally accelerated holes and electrons along the longitudinal direction.

13. A thermoelectromagnetic energy conversion system comprising:
   means for providing thermal energy to a thermoelectromagnetic energy converter;
   means for providing a field of magnetic flux density through a thermoelectromagnetic energy converter; and
   a thermoelectromagnetic energy converter positioned within the field of magnetic flux and in energy receiving relationship with the energy source, the energy converter including a p-n semiconductor junction parallel to the magnetic field having a depletion region on at least one side thereof and means for defining at least one central isolation region along a longitudinal dimension of the junction perpendicular to the magnetic field, the isolation region being in communication with the depletion region and permitting electrical communication between portions of the junction on opposite sides thereof only through the depletion region.

14. A thermoelectromagnetic energy converter comprising:
   a p-n junction defined in a chip of semiconductor material, the junction having a depletion region extending thereacross and end regions spaced apart along a longitudinal dimension parallel to the junction;

first and second dielectric regions disposed on opposite sides of the junction in communication with the depletion region, the dielectric regions being disposed between the spaced apart end regions and permitting electrical communication therebetween only through the depletion region;

means for forming electrical contact to opposite sides of the junction in each of the spaced apart end regions; and means for generating a magnetic flux through at least a portion of the depletion region, the flux being parallel to the junction and perpendicular to the longitudinal dimension.

15. The method of generating an electrical potential between two points longitudinally spaced along one side of a longitudinally extending junction having a contact potential producing an electric field intensity within a region near the junction, said points having no path of low electrical resistance between them comprising the steps of:

generating a magnetic flux at the junction between the longitudinally spaced points within the region within which the electric field intensity exists, said flux having at least a component thereof perpendicular to both the contact potential of the junction and the longitudinal direction; and generating electrical carriers within the region near the junction between the two longitudinally spaced points within which the electrical field intensity exists, said electrical carriers being driven under the influence of the electric field intensity and the magnetic flux to induce an electrical potential between the longitudinally spaced points.

16. The method of generating an electrical potential as set forth in claim 15 above, wherein the junction is a p-n semiconductor junction and wherein the step of generating electrical carriers includes the step of applying thermal energy to the region near the junction within which the electrical field intensity exists.

* * * * *